United States Patent [19]
Holman et al.

[11] Patent Number: 5,844,510
[45] Date of Patent: Dec. 1, 1998

[54] SYSTEM AND METHOD FOR EXTRACTING A DATA SIGNAL ENCODED ONTO FIRST AND SECOND BINARY SIGNALS

[75] Inventors: Andrew Holman, West Hills; Alex D. Samson, Marina, both of Calif.

[73] Assignee: ORA Electronics, Inc., Chatsworth, Calif.

[21] Appl. No.: 592,456

[22] Filed: Jan. 26, 1996

[51] Int. Cl.[6] .................................................. G06F 11/00
[52] U.S. Cl. ................................................. 341/94; 341/52
[58] Field of Search .................................. 341/52, 57, 58, 341/63, 61, 94

[56] References Cited

U.S. PATENT DOCUMENTS

| | | | |
|---|---|---|---|
| 4,056,819 | 11/1977 | Lukas ........................................ | 340/347 |
| 4,084,262 | 4/1978 | Lloyd et al. ............................. | 364/900 |
| 4,099,668 | 7/1978 | Feilchenfeld et al. ................... | 235/304 |
| 4,369,516 | 1/1983 | Byrns ....................................... | 375/110 |
| 4,599,723 | 7/1986 | Eck .......................................... | 371/47 |
| 4,736,424 | 4/1988 | Busby ...................................... | 380/50 |
| 4,785,396 | 11/1988 | Murphy et al. .......................... | 364/200 |
| 4,894,827 | 1/1990 | Ramsay et al. .......................... | 371/8.2 |
| 4,972,432 | 11/1990 | Wilson et al. ........................... | 375/7 |

FOREIGN PATENT DOCUMENTS 92-080348   7/1990   WIPO .

*Primary Examiner*—Jeffrey A. Gaffin
*Assistant Examiner*—Peguy JeanPierre
*Attorney, Agent, or Firm*—Matthew F. Jodziewicz

[57] ABSTRACT

A system and method for extracting a data signal transmitted by a signal source encoding the data signal onto first and second binary signals as a known two-bit binary state of the two signals taken together includes memory storing single bit binary patterns representative of known bit pattern and a reference table of two bit binary state couples representative of a data signal bit encoded onto the first and second binary signals. A processor monitors one of the first or second binary signals and compares the one monitored binary signal to the stored single bit binary patterns in memory. The processor stores, if a match is found, the respective binary states of the first and second binary signals in memory as a pair of two bit binary states. The processor then compares the stored pairs of two bit binary states representative of the first and second binary signals against the stored reference table of two bit binary state couples, and stores in memory a binary code representative of the encoded data signal bit represented by each such match.

19 Claims, 3 Drawing Sheets

SYSTEM AND METHOD FOR EXTRACTING A DATA SIGNAL ENCODED ONTO FIRST AND SECOND BINARY SIGNALS

NOTICE REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. General and Particular Scope of the Invention

The present invention relates in general to data transmission systems, and, more particularly, to a system and method for extracting a data signal transmitted by a signal source that encodes the data signal onto first and second binary signals.

2. Known Prior Art

Various data transmission systems are currently in use that encode a single data signal onto two or more binary signal lines in an attempt to avoid or at least lessen the chance of an error in reception induced by noise or improper synchronization of the sending and receiving systems. One such example is U.S. Pat. No. 4,369,516 to Byrns in which a single data signal is encoded onto two binary signal lines in accord with a known interrelationship between the two signal lines being used both to encode and decode the data signal. This transmission scheme is stated to both lessen the chance of error caused by nonsynchronization of the transmitting and receiving systems.

The problem with data transmission schemes such as that in Byrns is that it is implemented using dedicated hardware logic gates which in current software oriented processing systems robs the processor from its ability to perform other software controlled functions and operations.

The present invention overcomes this problem by providing a system and method that can be implemented with a minimal dedicated hardware component and that instead utilizes software implemented post-reception processing of the signals to extract the encoded data signal in post-time as opposed to the real-time processing demanded by systems such as Byrns.

Thus, with the present invention, a general processor under the control of software can be utilized with only minimal additional dedicated hardware to do not only the decoding of the encoded data signal, but also to support the various other functions and operations required of the processor to maintain the overall operation of the receiving system. The present invention is embodied in an apparatus for extracting a data signal transmitted by a signal source that encodes the data signal onto first and second binary signals. The data signal and the first and second binary signals each include a plurality of bits having a binary zero and a binary one state and where the data signal bits are encoded onto the first and second binary signals as a known two-bit binary state of the two signals taken together. The apparatus includes a first memory device that stores a plurality of binary patterns representative of known data addresses and a plurality of two bit binary state patterns, each representative of a data signal bit encoded onto the first and second binary signals. A monitoring circuit monitors one of the first or second binary signal lines. A first comparing circuit is coupled to both the monitoring circuit and the first memory device. The first comparing circuit compares the data bits appearing on the one monitored binary signal line to the plurality of stored binary patterns in the first memory device. A storing circuit, coupled to the first comparing means and to both of the first and second binary signal lines, stores, if a match is found between the one monitored binary signal and the plurality of stored binary patterns in the first memory device, the respective binary states of the first and second binary signals in a second memory device as a plurality of two bit binary states. A second comparing circuit is coupled to both the first and second memory devices and compares the stored plurality of two bit binary states representative of the first and second binary signals against the plurality of stored two bit binary states patterns. The second storing circuit stores in a third memory device a binary code representative of the encoded data signal bit that is represented by each such match.

The present invention is also embodied in a method for extracting a data signal transmitted by a signal source that encodes the data signal onto first and second binary signals. The data signal and first and second binary signals each include a plurality of bits having a binary zero and a binary one state and where the data signal bits are encoded onto the first and second binary signals as a known two-bit binary state of the two signals taken together. The method comprises the steps of:

storing a plurality of binary patterns representative of a known data address in a first memory;

storing a plurality of two bit binary state patterns, each representative of a data signal bit encoded onto the first and second binary signals in a second memory;

monitoring one of the first or second binary signals;

comparing the one monitored binary signal to the plurality of stored binary patterns in the first memory;

storing, if a match is found between the one monitored binary signal and the plurality of stored binary patterns in the first memory, both the first and second binary signals in a third memory as a plurality of two bit binary states;

comparing the stored plurality of two bit binary states representative of the first and second binary signals against the plurality of stored two bit binary states patterns and storing in a fourth memory a binary code representative of the encoded data signal represented by each such match.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT OF THE INVENTION

Figure 1:
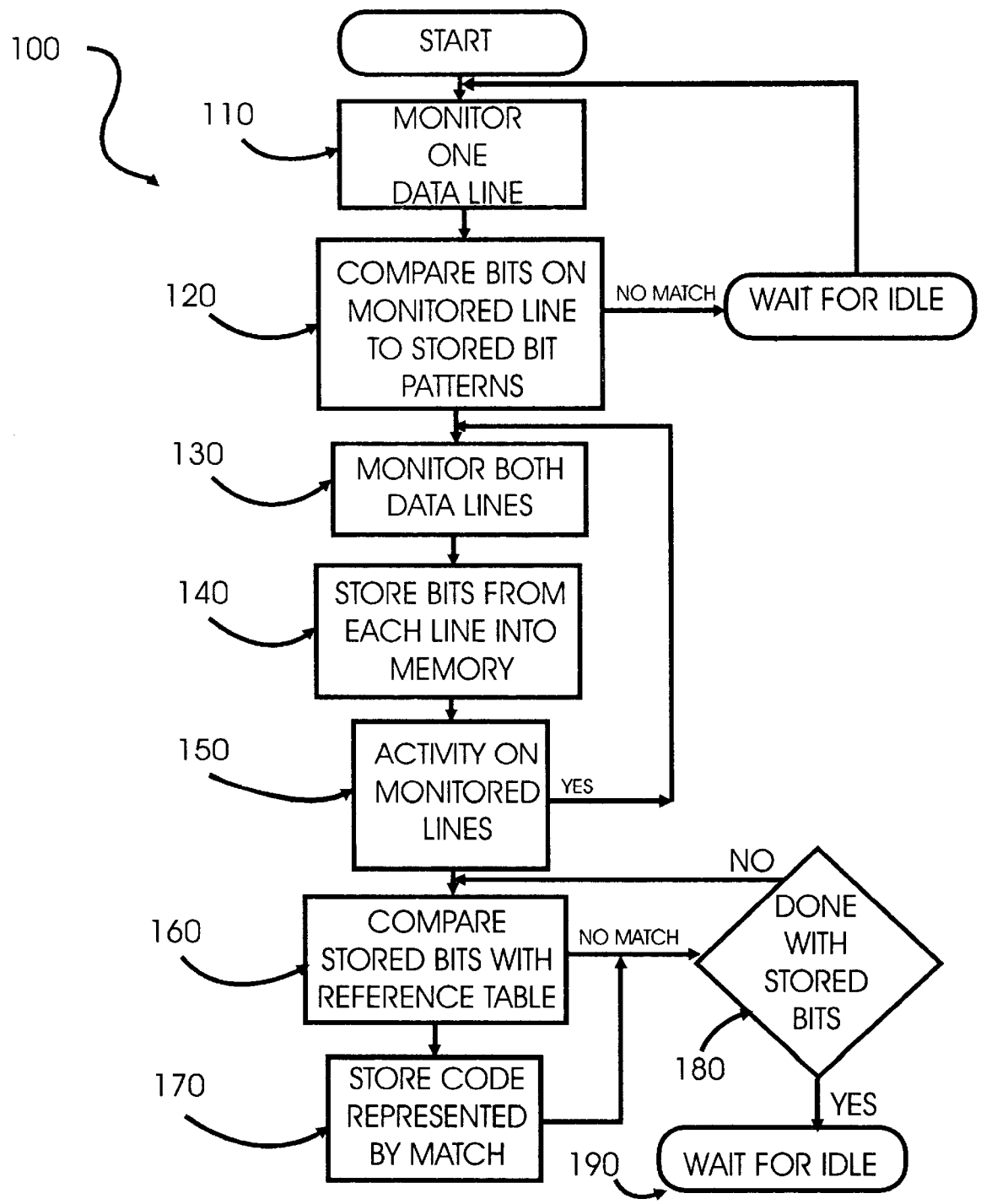
FIG. 1 is a block diagram of the logic or operational flow for a data receiver embodying the present invention.

A preferred embodiment of the present invention as found in a method of extracting a data signal transmitted by a signal source that has encoded the data signal onto first and second binary signals is now described with reference to FIG. 1. The data signal and first and second binary signals each constitute a plurality of bits having a binary zero and a binary one state and where the data signal bits are encoded onto the first and second binary signals as a known two-bit binary state of the two signals taken together.

The preferred method comprises the steps of:

Storing a plurality of binary patterns into a memory device such as RAM. Generally, it is preferred that these stored bit patterns be representative of known data addresses for specific system devices of interest to which a data signal may be addressed. By limiting any further processing to those particular devices that are of interest, this makes the method more efficient in utilizing its processing operations.

Likewise, for use as described in greater detail below, the method continues by storing a plurality of two bit binary state patterns as a reference table. Each elements in the reference table are a pair of bit states and are selected to be representative of a data signal bit encoded onto the first and second binary signals.

The method now begins by monitoring in block 110 one of the first or second binary signal lines.

The bits on the one monitored binary signal line are compared in block 120 to the plurality of stored binary patterns representative of known data addresses for specific system devices of interest to which a data signal may be addressed which were previously stored in memory.

If a match is found between the bits appearing on the one monitored binary signal line and the plurality of stored binary patterns representative of known data addresses for specific system devices of interest to which a data signal may be addressed which were previously stored in memory, both the first and second binary signal lines are now monitored as shown in block 130 and the monitored bits are stored 140 in memory as a plurality of two bit binary states, i.e., a binary pair of bits one from each line. It is preferred that the monitored bits be sampled at a fixed rate, such as 250 milliseconds and that each sampled interval be handled as a single monitored bit for each signal line. It is preferred that this sampling or monitoring operation be independent of any change in binary states in the first or second binary signals.

If no match is found, the method recycles back to monitoring one line as in block 110 until a match is found in block 120 and it proceeds to block 130 as described above.

The lines are continued to be monitored in block 150 to insure that activity on the lines is continuing. If the activity is determined to be continuing, the bits stored as in blocks 130 and 140. If activity on the lines has ceased, the method moves on to processing the stored bit pairs as described further below.

One preferred method of determining continued activity on the lines is to determine if no change occurs between successive bit pairs on the two lines for a predetermined period of time, or if a single line continues without changing its bit state for a predetermined period of time. Either of these instances is an indicator that activity on the lines has ceased and the method can proceed to the processing steps described below.

The stored plurality of two bit binary states which are representative of the first and second binary signals are now compared in block 160 against the stored reference table where each of the elements in the reference table are a pair of bit states and are selected to be representative of a data signal bit encoded onto the first and second binary signals.

If a match is found in the preceding step, a binary code representative of the encoded data signal bit represented by each such match is stored in memory in block 170 as representative of the encoded data signal.

Once all of the stored bits are compared for matches in block 180, the method concludes in block 190 as having decoded the previously encoded data signal.

An alternate embodiment of the method of the present invention is to store both of the first and second binary signals in memory as a plurality of two bit binary states at the outset of the method. The comparisons and conditional storing then described above are performed on the stored plurality of two bit binary states instead of having to monitor the signal lines as suggested above.

This alternate embodiment is not as preferred as the previously described embodiment due to the fact that while processing of the stored data is occurring, unless the signal lines are continued to be stored, information may be lost while the processing occurs. However, with sufficiently fast processors and rapid sampling times this alternate method will also work and embodies the present invention.

A preferred implementation of the present invention in an apparatus for extracting a data signal transmitted by a signal source that encodes the data signal onto first and second binary signals is now described with reference to FIG. 2. The data signal and first and second binary signals onto which the data signal is encoded each include a plurality of bits having a binary zero and a binary one state and where the data signal bits are encoded onto the first and second binary signals as a known two-bit binary state of the two signals taken together.

The apparatus includes circuitry generally 200 that stores a plurality of binary patterns representative of a known data address and a plurality of two bit binary state patterns, each representative of a data signal bit encoded onto the first and second binary signals into a memory 210.

A processor 220 is used for monitoring one of the first or second binary signals 230, 240 respectively.

Processor 220, operates under software control to compare the one monitored binary signal to the plurality of stored binary patterns stored in ROM memory 210, or, in the alternative, in memory 250.

If a match is found between the one monitored binary signal and the plurality of stored binary patterns in memory 210, processor 220 stores the respective binary states of the first and second binary signals in a second memory 250 as a plurality of two bit binary states. Memory 250 is preferably RAM type memory an is used for retaining data for processing by processor 220.

Processor 220 samples and stores the monitored first and second binary signals occurring on lines 230 and 240 in memory 250 as a plurality of two bit binary states. One preferred sampling interval is about 250 milliseconds.

Processor 220 compares the stored plurality of two bit binary states representative of the first and second binary signals stored in memory 250 against the plurality of two bit binary states patterns stored in memory 210. The bits representing a match are stored by processor 220 in memory 250, as such binary bits are representative of the encoded data signal represented by each such match.

It should be seen that processor 220 provides circuitry for monitoring at least one of the first and second binary signal lines and, operating under appropriate software control, is capable of stopping the storing of the first and second binary signals in memory 250 whenever signal activity on the monitored signal line has ceased for a predetermined period of time.

Processor 220 can monitor either a single line or both of lines 230, 240 to determine activity status. One preferred method of determining continued activity on lines 230, 240 is to determine if no change occurs between successive bit pairs on the two lines for a predetermined period of time, or if a single line continues without changing its bit state for a predetermined period of time. Either of these instances is an indicator that activity on the lines has ceased and processor 220 can proceed to the processing steps described above.

Figure 2:
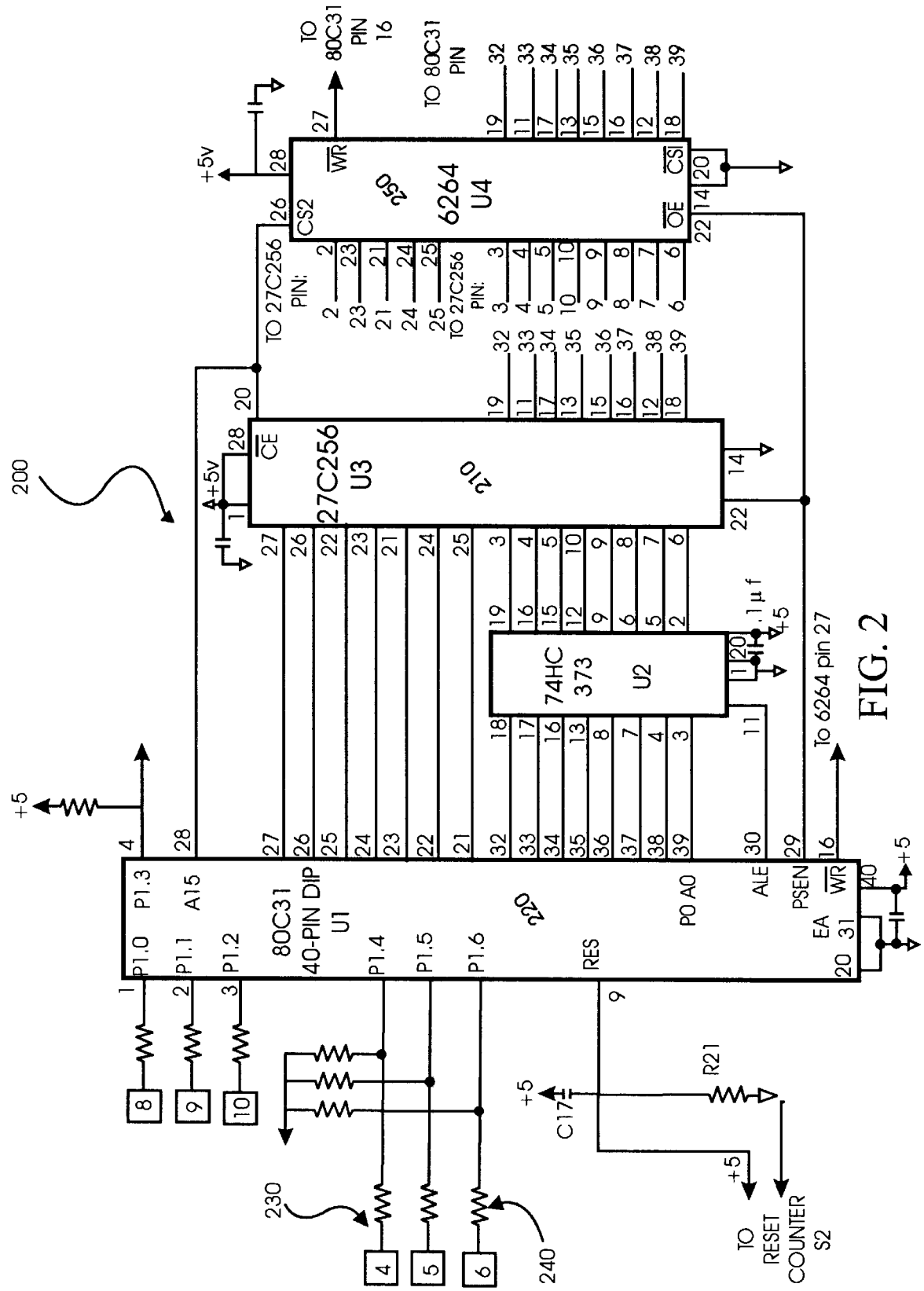
FIG. 2 is a schematic diagram of a circuit embodying the present invention; and, FIG. 3 is a timing diagram illustrating the wave forms for a data receiver embodying the present invention.
Figure 3:
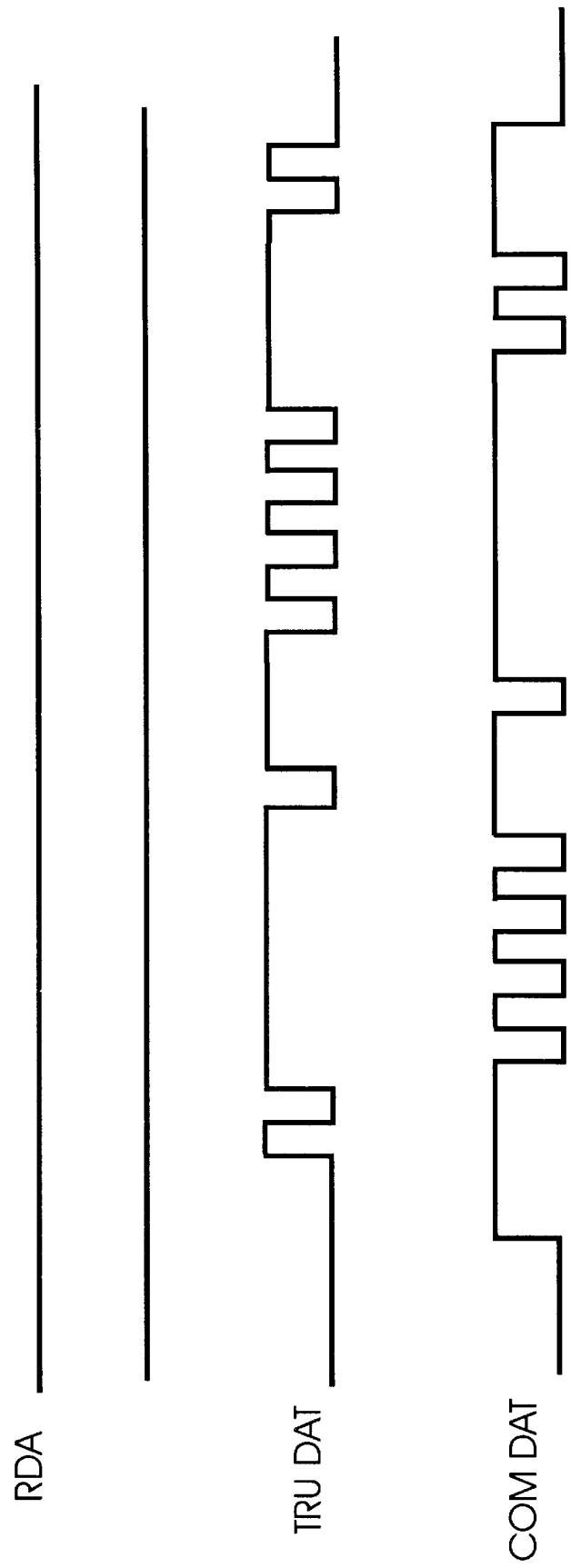

Finally, FIG. 3 illustrates the waveforms appearing on binary lines 230 and 240 that are monitored and processed by processor 220 of FIG. 2.

Processor 220 monitors, in this example, the TRU DAT (true data) line shown until it receives an initial signal pattern that matches one stored in memory. This is shown to be the sequence 1011111111101 which matches a stored sequence indicating that there is a data signal being addressed to a peripheral of interest.

Processor 220 then begins to monitor and store the next sequence of bits appearing on lines TRU DAT and COM DAT as bit pairs, i.e., (1,0), (1,1), (0,1) etc. until it senses that activity on the lines has terminated due to a change in bit status for a predetermined period of time, i.e., 0 appearing on both TRU DAT and/or on COM DAT lines for a predetermined period of time without change.

In the alternative, processor 220 can be programmed to end its monitoring of the signal lines when both signal lines are sensed to have gone to a logic low voltage state for a predetermined period of time, indicating the end of signal activity on the lines.

Processor 220 now begins post-capture analysis of the bit stream pairs captured under its software program designed to match the captured bit pairs against a reference table of bit pairs and extract or decode the data bit encoded onto the two lines TRU DAT and COM DAT.

It should be noted that the sampling rate used to select and store the bit status on the two lines is important and must be sufficiently high to insure that changes in bit status are slower than the sampling divisions chosen for monitoring and sampling the lines in order not to miss a bit change. A sampling rate of about 250 milliseconds has been found to be sufficient in tested cases.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A method of extracting a data signal transmitted by a signal source that encodes the data signal onto first and second binary signals, the data signal and first and second binary signals each including a plurality of bits having a binary zero and a binary one state and where the data signal bits are encoded onto the first and second binary signals as a known two-bit binary state of the two signals taken together, comprising the steps of:

monitoring one of the first or second binary signals;

comparing the one monitored binary signal to a plurality of binary patterns representative of a known data address in a first memory;

storing, if a match is found between the one monitored binary signal and the plurality of stored binary patterns in the first memory, both the first and second binary signals in a third memory as a plurality of two bit binary states;

comparing the stored plurality of two bit binary states representative of the first and second binary signals against a plurality of two bit binary state patterns, each representative of a data signal bit encoded onto the first and second binary signals in a second memory and storing in a fourth memory a binary code representative of the encoded data signal represented by each such match.

2. A method as in claim 1 further including the step of:

monitoring at least one of the first and second binary signal lines and stopping storing of the first and second binary signals in the third memory whenever signal activity on the at least one monitored signal line has ceased for a predetermined period of time.

3. A method as in claim 1 further including the step of:

monitoring one of the first or second binary signal lines and stopping storing of the first and second binary signals in the third memory whenever signal activity on the one monitored line has ceased for a predetermined period of time.

4. A method as in claim 1 further including the step of:

monitoring the first and second binary signal lines and stopping storing of the first and second binary signals in the third memory whenever both of the first and second binary signal lines go to a logic low voltage for a predetermined period of time.

5. A method as in claim 1 further including the step of:

generating a sampling signal, and storing each one of the plurality of two bit binary states of said first and second binary signals in said second memory means in response to said sampling signal.

6. A method as in claim 5 wherein the step of generating a sampling signal further includes the step of:

generating the sampling signal independently of any change in binary states in the first and second binary signals.

7. A method as in claim 1 further including the step of:

storing a plurality of binary patterns representative of a known data address in a first memory.

8. A method as in claim 1 further including the step of:

storing a plurality of two bit binary state patterns, each representative of a data signal bit encoded onto the first and second binary signals in a second memory.

9. A method of extracting a data signal transmitted by a signal source that encodes the data signal onto first and second binary signals, the data signal and first and second binary signals each including a plurality of bits having a binary zero and a binary one state and where the data signal bits are encoded onto the first and second binary signals as a known two-bit binary state of the two signals taken together, comprising the steps of:

storing both the first and second binary signals in a memory as a plurality of two bit binary states;

comparing the stored plurality of two bit binary states representing at least one of the first and second binary signals to a plurality of binary patterns representative of a known data address;

comparing, if a match if found between the stored plurality of two bit binary states representing at least one of the first and second binary signals and the plurality of binary patterns representative of a known data address, the stored plurality of two bit binary states representative of the first and second binary signals against a plurality of two bit binary state patterns, each representative of a data signal bit encoded onto the first and second binary signals and storing in the memory a binary code representative of the encoded data signal represented by each such match.

10. A method as in claim 9 further including the step of:

generating a sampling signal, and storing each one of the plurality of two bit binary states of said first and second binary signals in said second memory means in response to said sampling signal.

11. A method as in claim 10 wherein the step of generating a sampling signal further includes the step of:

generating the sampling signal independently of any change in binary states in the first and second binary signals.

12. A method as in claim 9 further including the step of:

storing a plurality of binary patterns representative of a known data address in the memory.

13. A method as in claim 9 further including the step of:

storing a plurality of two bit binary state patterns, each representative of a data signal bit encoded onto the first and second binary signals in the memory.

14. An apparatus for extracting a data signal transmitted by a signal source that encodes the data signal onto first and second binary signals, the data signal and first and second binary signals each including a plurality of bits having a binary zero and a binary one state and where the data signal bits are encoded onto the first and second binary signals as a known two-bit binary state of the two signals taken together, comprising:

first memory means storing a plurality of binary patterns representative of a known data address and a plurality of two bit binary state patterns, each representative of a data signal bit encoded onto the first and second binary signals;

means for monitoring one of the first or second binary signals;

first means, coupled to said monitoring means and said first memory means, for comparing the one monitored binary signal to the plurality of stored binary patterns in said first memory means;

means, coupled to said first comparing means and to said first and second binary signals, for storing, if a match is found between the one monitored binary signal and the plurality of stored binary patterns in the first memory means, the respective binary states of the first and second binary signals in a second memory means as a plurality of two bit binary states; and, second means, coupled to said first and second memory means, for comparing the stored plurality of two bit binary states representative of the first and second binary signals against the plurality of stored two bit binary states patterns, and storing in a third memory means a binary code representative of said encoded data signal represented by each such match.

15. The apparatus of claim 14 wherein said means for storing both the first and second binary signals in a second memory means as a plurality of two bit binary states further includes:

means for monitoring at least one of the first and second binary signal lines and stopping storing of the first and second binary signals in the third memory whenever signal activity on the at least one monitored signal line has ceased for a predetermined period of time.

16. The apparatus of claim 14 wherein said means for storing both the first and second binary signals in a second memory means as a plurality of two bit binary states further includes:

means for monitoring one of the first or second binary signal lines and stopping storing of the first and second binary signals in the third memory whenever signal activity on the one monitored signal line has ceased for a predetermined period of time.

17. The apparatus of claim 14 wherein said means for storing both the first and second binary signals in a second memory means as a plurality of two bit binary states further includes:

means for monitoring the first and second binary signal lines and stopping storing of the first and second binary signals in the third memory whenever both of the first and second binary signal lines go to a logic low voltage for a predetermined period of time.

18. The apparatus of claim 14 further including:

means for generating a sampling signal, said means for storing said first and second binary signals in said second memory means as a plurality of two bit binary states storing each one of the plurality of two bit binary states in response to said sampling signal.

19. The apparatus of claim 18 wherein said means for generating a sampling signal generates said sampling signal independently of any change in binary states in the first and second binary signals.

* * * * *